Feb. 10, 1948. W. O. FLEENOR 2,435,741
COMBINED TONGS AND MAGNIFYING GLASS
Filed Oct. 20, 1944
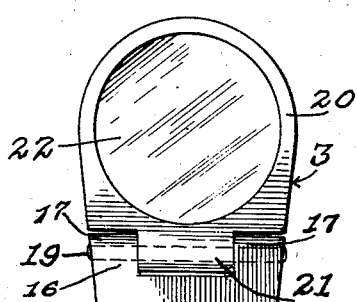
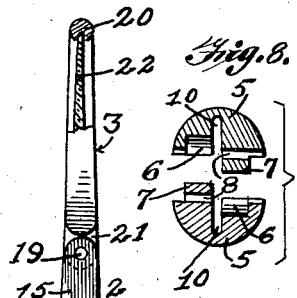
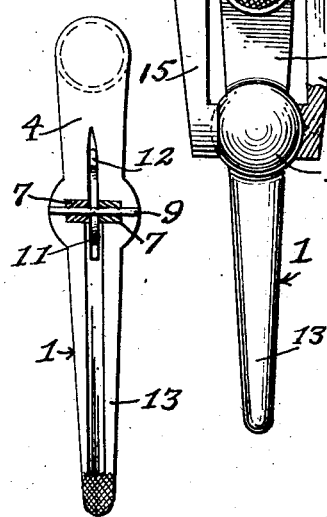
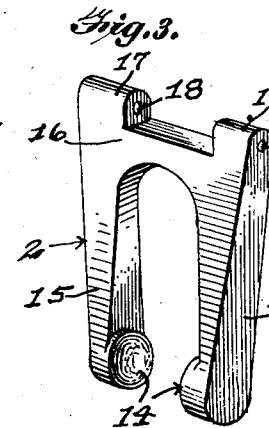
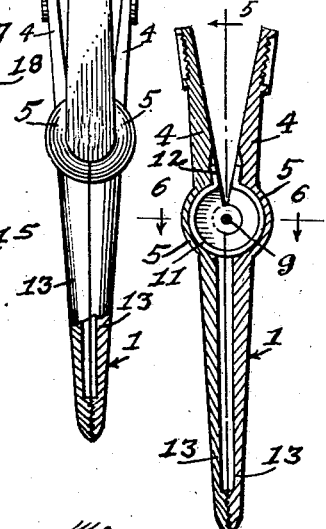
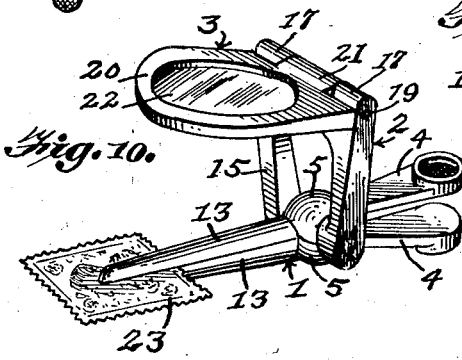
Inventor,
WARREN O. FLEENOR.

Patented Feb. 10, 1948

2,435,741

UNITED STATES PATENT OFFICE 2,435,741

COMBINED TONGS AND MAGNIFYING GLASS

Warren O. Fleenor, Stafford, N. Y.

Application October 20, 1944, Serial No. 559,566

5 Claims. (Cl. 88—39)

This invention relates to a combined tongs and magnifying glass.

An object of this invention is the construction of a simple and efficient device which can be operated by one hand for examining objects.

Another object of the invention is the construction of a novel device that is operated by one hand for examining articles, such as stamps, under a magnifying glass.

A still further object of the invention is the construction of a novel and efficient device in which tongs and a magnifying device are peculiarly assembled, whereby an operator can manipulate the device with one hand for examining objects, such as stamps, jewelry, and the like.

Another object of this invention is the provision of novel means whereby the tongs may revolve or rotate or turn in any direction within the sockets of the arms of the yoke, for the efficient examining of the object being inspected.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a plan view of a device constructed in accordance with this invention.

Figure 2 is a view in side elevation, part of the magnifying device being shown in sections.

Figure 3 is a perspective view of the yoke.

Figure 4 is a vertical, central, sectional view of the tongs.

Figure 5 is a sectional view, taken on line 5—5, Figure 4.

Figure 6 is a sectional view, taken on line 6—6, Figure 4.

Figure 7 is a fragmentary view of one of the handles of the tongs, shown in elevation.

Figure 8 is a sectional view, taken on line 8—8, Figure 7.

Figure 9 is a plan view of the spring.

Figure 10 is a perspective view of the device, shown in operation.

Referring to the drawings by numerals, I designates the tongs, 2 the single piece substantially U-shaped yoke, and 3 the magnifying device. The tongs comprise two handles 4. Each handle 4 is provided with a hub 5. Each hub 5 has on its inner face a socket 6 and a lug 7 (Figs. 7 and 8). Each lug 7 is provided with an opening or aperture 8. When the two hubs 5 are placed together and pin 9 is inserted in the apertures 8, the handles 4 will be pivotally secured together. Each hub 5 is provided with a longitudinally extending, spring receiving socket 10. A spring 11 is placed in sockets 10, around pin 9, with ends 12 of said spring extending towards the outer end of said handles 4. By this construction, jaws 13 are normally held securely together at their outer ends, Fig. 4.

The hubs 5 constitute a ball-like structure, whereby the sockets 14 on arms 15 of yoke 2 are adapted to turn, during the operation of the device. The arms 15 extend from the body 16 of the substantially U-shape yoke 2, and said arms 15 have a sufficient springy action to allow the insertion of and clamp upon the tongs, as shown. Ears 17 project outwardly from body 16. Each ear has an aperture 18, through which a suitable pin 19 extends.

The magnifying device 3 comprises a frame 20 that is provided with a cylinder-like projection 21. A magnifying glass 22 is held in frame 20. The projection 21 is positioned between ears 17, with pin 19 extending therethrough, whereby the frame 20 is adjustably mounted upon yoke 2. The movement of frame 20 is limited by the portions of the frame contiguous to the ears 17 coming in contact therewith, as clearly shown in Figure 10.

When the operator desires to examine an object, such as the stamp 23, the same is grasped between the jaws 13 and the operator swings the yoke to a position substantially at right angles to the tongs, and then swings the magnifying device so as to focus properly on the article to be examined. This operation can be performed by one hand, two of the fingers grasping the handles of the tongs, and another finger manipulating the yoke and the magnifying device. Referring to Fig. 10, if it is desired to turn the stamp 23 over and observe the watermark, this may be done, since the tongs can be revolved upon the yoke; also, if it is desired to observe rock specimens or jewels, the tongs may be revolved 90 degrees from the position shown in Fig. 10.

The term "tongs," specified in the foregoing specification and the following claims, is used in a broad sense, meaning any clamping means, such as tongs, tweezers, pliers, etc., that have the novel features and combinations of my invention.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is

1. In a device of the class described, the combination of a single piece substantially U-shape yoke provided with springy clamping arms, said arms provided with hub-holding means on their inner sides, tongs between said arms, said tongs provided with a hub seated in said holding means, and a magnifying device hingedly mounted on said yoke.

2. In a device of the class described, the combination of a single piece substantially U-shape yoke provided with springy clamping arms, said arms provided on their outer end with inwardly extending sockets, tongs provided with a hub, and said hub seated in said sockets, whereby said tongs are held entirely in a movable condition, and a magnifying device hingedly mounted on said yoke.

3. In a device of the class described, the combination of tongs, said tongs comprising a pair of handles, each handle having a semi-cylindrical hub portion, one hub portion provided with a socket and an extending lug, the other socket portion provided with a socket and a lug to register with the socket and lug on the first mentioned socket portion, a yoke frictionally clamping the hub portions of said tongs, and magnifying means on said yoke.

4. In a device of the class described, the combination of tongs, said tongs comprising a pair of handles, said handles provided near their centers with a hub, said hub comprising interlocking socket and lug means, said handles provided with a coil spring around said interlocking socket and lug means, said spring provided with ends extending longitudinally of said handles, and a yoke provided with magnifying means frictionally engaging only said hub.

5. In a device of the class described, the combination of a single piece U-shaped yoke provided with springy clamping arms, each arm being provided with a socket on its inner side and at its end, tongs having a ball hub, said hub being seated in said sockets, and a magnifying lens hinged along the bridge of said yoke to focus on the gripping end of said tongs.

WARREN O. FLEENOR.

REFERENCES CITED

The following references are of record in the file of this patent:

UNITED STATES PATENTS

| Number | Name | Date |
|---|---|---|
| 467,630 | Roland | Jan. 26, 1892 |
| 718,748 | Boehm | Jan. 20, 1903 |
| 1,056,307 | Sullivan | Mar. 18, 1913 |
| 2,355,161 | Holstein | Aug. 8, 1944 |

FOREIGN PATENTS

| Number | Country | Date |
|---|---|---|
| 598,004 | France | Sept. 14, 1925 |
| 512,177 | France | Oct. 7, 1920 |
| 42,466 | France | May 2, 1933 |
|  | (1st addition to 733,871) | |
| 378,727 | Germany | July 30, 1923 |
| 463,979 | Germany | Aug. 7, 1928 |
| 355,556 | Germany | June 28, 1922 |